US011359696B2

(12) United States Patent
Firor et al.

(10) Patent No.: US 11,359,696 B2
(45) Date of Patent: Jun. 14, 2022

(54) COMPACT MODULAR RIGHT-ANGLE DRIVE GEAR ALIGNED ACTUATOR

(71) Applicant: Raytheon Company, Waltham, MA (US)

(72) Inventors: Randall S. Firor, Tucson, AZ (US); Cade Wilson, Tucson, AZ (US); John F. Bugge, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 14 days.

(21) Appl. No.: 16/893,635

(22) Filed: Jun. 5, 2020

(65) Prior Publication Data

US 2021/0123503 A1  Apr. 29, 2021

Related U.S. Application Data

(60) Provisional application No. 62/926,098, filed on Oct. 25, 2019.

(51) Int. Cl.
*F16H 1/12* (2006.01)
*F16H 3/78* (2006.01)
*F16H 1/28* (2006.01)
*H02K 7/116* (2006.01)
*B23Q 5/04* (2006.01)

(52) U.S. Cl.
CPC .............. *F16H 1/12* (2013.01); *F16H 1/28* (2013.01); *F16H 3/78* (2013.01); *H02K 7/116* (2013.01); *B23Q 5/045* (2013.01)

(58) Field of Classification Search
None
See application file for complete search history.

(56) References Cited

U.S. PATENT DOCUMENTS

| 4,272,040 | A | 6/1981 | Bastian | |
|---|---|---|---|---|
| 4,274,610 | A | 6/1981 | Bastian | |
| 8,313,403 | B2 * | 11/2012 | Wilson, Jr. | B25F 5/001 475/149 |
| 9,228,640 | B2 * | 1/2016 | Ohm | F16H 57/08 |

(Continued)

FOREIGN PATENT DOCUMENTS

| EP | 2733389 B1 | 3/2016 |
|---|---|---|
| JP | 2013155800 A | 8/2013 |

(Continued)

OTHER PUBLICATIONS

International Search Report and Written Opinion for corresponding International Application No. PCT/US2020/039528 dated Oct. 14, 2020.

*Primary Examiner* — Leslie A Nicholson, III
(74) *Attorney, Agent, or Firm* — Renner, Otto, Boisselle & Sklar, LLP

(57) ABSTRACT

A gear drive, such as for an actuator, is a right-angle drive where toothed outer ridge of a face gear is coupled to teeth of a motor output shaft, and a set of planetary gears are engaged with a central sun gear of the face gear. The sun gear and planetary gears are aligned with the motor output shaft. For instance the motor output shaft may be substantially in the same plane with the sun gear and the planetary gears. From another standpoint the axis of the motor output shaft may intersect the sun gear, as well as intersecting a volume that the planetary gears sweep through as the planetary gears engage the sun gear.

20 Claims, 3 Drawing Sheets

(56) References Cited

U.S. PATENT DOCUMENTS

| | | | |
|---|---|---|---|
| 9,531,238 B2 | 12/2016 | Bugge | |
| 9,815,192 B1* | 11/2017 | Du | F16H 1/28 |
| 10,377,037 B2* | 8/2019 | Du | F16H 1/46 |
| 2006/0191369 A1* | 8/2006 | Cockerham | B60N 2/0232 |
| | | | 74/500.5 |
| 2006/0272444 A1* | 12/2006 | Cockerham | B60N 2/0232 |
| | | | 74/502.6 |
| 2010/0273597 A1* | 10/2010 | Wilson, Jr. | F16H 37/041 |
| | | | 475/149 |
| 2012/0077637 A1* | 3/2012 | Chen | B25J 9/102 |
| | | | 475/336 |
| 2014/0020491 A1 | 1/2014 | Palfenier | |
| 2018/0207796 A1 | 7/2018 | Du | |

FOREIGN PATENT DOCUMENTS

| | | |
|---|---|---|
| WO | 2012060333 A1 | 5/2012 |
| WO | 2018045495 A1 | 3/2018 |

* cited by examiner

COMPACT MODULAR RIGHT-ANGLE DRIVE GEAR ALIGNED ACTUATOR

CROSS-REFERENCE TO RELATED APPLICATION

This application claims priority under 35 USC 119 to U.S. Provisional Application 62/926,098, filed Oct. 25, 2019, which is incorporated by reference in its entirety.

FIELD OF THE INVENTION

The invention is in the field of actuators and gear drive trains for producing rotational movement.

DESCRIPTION OF THE RELATED ART

Rotational actuators are used in a variety of situations. One example is in aerospace vehicles.

In the past hypersonic vehicles have use actuation that is set back a specific distance from the control surface and control entrance into the vehicle, thereby avoiding the extreme heat present in this entry area. The problem with this is an extended drivetrain is an increase in backlash and a loss of stiffness and efficiency.

There is thus room for improvement in rotational actuators.

SUMMARY OF THE INVENTION

A modular actuator may be packaged with its own position sensor, drivetrain, and support bearings built in and can be tested for performance by itself before being integrated in the vehicle. This makes a compound modular actuator (CMA) of the modular variety usable across multiple platforms and readily scalable for different loads and torques. It is readily adaptable to other system simply by changing the motor size and/or different support bearings and/or gear diameters or number of gear teeth.

In some environments, such as in a hypersonic flight vehicle, a control actuator will be exposed to a high level of heating present in the hypersonic environment. Actuators such as those described below will mitigate the heat present on the control surface and surrounding shell of the vehicle and maintain performance against aero and inertial loads.

A gear drive, which may part of a rotational actuator, is a right-angle drive with a motor shaft aligned with a central hub gear of a face gear that meshes with the motor output shaft.

A gear drive, which may part of a rotational actuator, has a motor output shaft that is substantially coplanar with a sun gear and planetary gears to obtain the highest available efficiency and stiffness values.

A gear drive, which may part of a rotational actuator, has a face gear that overlaps planetary gears that engage with (mesh with) a central hub sun gear of the face gear that supports the most compact, stiffest, and efficient design.

An actuator includes air gaps in a gear drive, to mitigate or reduce migration of heat through the gear drive.

According to an aspect of the invention, a control actuator (or actuator) includes: a drivetrain; wherein the drivetrain includes a gear set, for example a planetary gear set.

According to an embodiment of any paragraph(s) of this summary, the drivetrain is a compact drivetrain.

According to an embodiment of any paragraph(s) of this summary, the drivetrain is a two-stage drivetrain.

According to an embodiment of any paragraph(s) of this summary, the actuator includes a control shaft (or motor shaft) operatively coupled to the drivetrain.

According to an embodiment of any paragraph(s) of this summary, there is a restricted thermal path between the gear set and a distal end of the control shaft.

According to an embodiment of any paragraph(s) of this summary, air gaps are located within the actuator, to restrict thermal transmission.

According to an embodiment of any paragraph(s) of this summary, the air gaps include one or more gaps located between the gear set and the distal end of the control shaft.

According to an embodiment of any paragraph(s) of this summary, the air gaps include an air gap at a proximal end of the control shaft.

According to an embodiment of any paragraph(s) of this summary, the actuator further including a position sensor.

According to an embodiment of any paragraph(s) of this summary, the position sensor is located at the distal end of the control shaft.

According to an embodiment of any paragraph(s) of this summary, the actuator further includes an additional position sensor.

According to an embodiment of any paragraph(s) of this summary, the gear set includes a stiff drive gear (or a stiff drive train or a set of stiff gears).

According to an embodiment of any paragraph(s) of this summary, the drive gear is coupled to a motor.

According to an embodiment of any paragraph(s) of this summary, the gear set includes a face gear.

According to an embodiment of any paragraph(s) of this summary, one or more parts of made of stainless steel.

According to an embodiment of any paragraph(s) of this summary, most of the parts are made of stainless steel.

According to an embodiment of any paragraph(s) of this summary, one or more parts are made of titanium, and/or other suitable materials, such as nickel-chromium-based alloys, for example those sold under the trademark Inconel.

According to an embodiment of any paragraph(s) of this summary, one or more parts are made of metal, for instance steel (such as stainless steel) or titanium.

According to an embodiment of any paragraph(s) of this summary, the position sensor is operatively coupled to and/or part of a control loop, such as for control and/or operation of the actuator.

According to an embodiment of any paragraph(s) of this summary, the actuator further includes bearings between relatively rotating parts.

According to an embodiment of any paragraph(s) of this summary, bearings includes a control surface support bearing, such as a control fin support bearing.

According to an embodiment of any paragraph(s) of this summary, at least one of the bearings is not exposed to a high temperature.

According to an embodiment of any paragraph(s) of this summary, the actuator includes limited-contact-area portions that mitigate thermal transfer within the actuator.

According to an embodiment of any paragraph(s) of this summary, gear interfaces between gears of the gear set are one of a group consisting of co-planar, substantially in the same plane, and/or roughly in the same plane.

According to an embodiment of any paragraph(s) of this summary, the actuator includes and/or operates as a right-angle motor.

According to an embodiment of any paragraph(s) of this summary, the control actuator has a stiffness roughly at least seven times a frequency response, for example being at least six times the frequency response, or at least five times the frequency response, or any range using any of these values (or between the various specified values).

According to an embodiment of any paragraph(s) of this summary, the actuator has a limited rotation, with for example a hard stop providing a limit on rotation.

According to an embodiment of any paragraph(s) of this summary, the actuator has a fully 360-degree rotation.

According to an embodiment of any paragraph(s) of this summary, the actuator is part of a flight vehicle.

According to an embodiment of any paragraph(s) of this summary, the actuator is part of a hypersonic flight vehicle.

According to an embodiment of any paragraph(s) of this summary, the actuator is part of a space vehicle.

According to an embodiment of any paragraph(s) of this summary, the actuator operably coupled to a control surface, and is used to rotate the control surface.

According to an embodiment of any paragraph(s) of this summary, the control surface includes a flap, elevon, rudder, elevator, aileron, or canard.

According to an embodiment of any paragraph(s) of this summary, the actuator is part of a thrust reverser.

According to an embodiment of any paragraph(s) of this summary, the actuator is part of a jet engine.

According to an embodiment of any paragraph(s) of this summary, the actuator is part of pump.

According to another aspect of the invention, a method of actuation includes using the control actuator of any of the other paragraph(s) of this summary to control movement of an object.

According to an embodiment of any paragraph(s) of this summary, the object is a control surface.

According to an aspect of the invention, a gear drive includes: a motor having a motor output shaft; and gearing operatively coupled to the motor; wherein the gearing includes: a face gear having a toothed ridge engaging the motor output shaft, and a central sun gear; and planetary gears engaging the sun gear.

According to an embodiment of any paragraph(s) of this summary, the motor output shaft, the sun gear, and the planetary gears are substantially co-planar.

According to an embodiment of any paragraph(s) of this summary, the motor output shaft defines a motor output shaft axis about which the motor output shaft rotates.

According to an embodiment of any paragraph(s) of this summary, the motor output shaft axis substantially perpendicular to a sun gear shaft axis of the sun gear According to an embodiment of any paragraph(s) of this summary, the axis intersects the sun gear.

According to an embodiment of any paragraph(s) of this summary, the axis also intersects a volume swept out by the planetary gears as the planetary gears rotate about the sun gear.

According to an embodiment of any paragraph(s) of this summary, the planetary gears are connected to a control output shaft that acts as a carrier for the planetary gears, and that rotates as the planetary gears orbit around the sun gear.

According to an embodiment of any paragraph(s) of this summary, the control output shaft in part defines an outer air gap between the control output shaft and the part to be rotated, with the first air gap including a recess in the control output shaft.

According to an embodiment of any paragraph(s) of this summary, the control output shaft in part defines a central air gap where the sun gear meshes with the planetary gears.

According to an embodiment of any paragraph(s) of this summary, the gear drive further includes a part to be rotated, attached to the control output shaft.

According to an embodiment of any paragraph(s) of this summary, the part to be rotated is a fin, a control surface, a flap, an elevon, a rudder, an elevator, an aileron, or a canard.

According to an embodiment of any paragraph(s) of this summary, the face gear overlaps the planetary gears.

According to an embodiment of any paragraph(s) of this summary, the face gear has a diameter larger than an overall diameter of a combination of the sun gear, and the planetary gears engaged with the sun gear.

According to an embodiment of any paragraph(s) of this summary, the motor output shaft is a part of a two-piece motor shaft.

According to an embodiment of any paragraph(s) of this summary, a position sensor is operatively coupled to a motor shaft of which the motor output shaft is at least a part.

According to an embodiment of any paragraph(s) of this summary, the position sensor is at an opposite end of the motor from the motor output shaft and the toothed ridge of the face gear.

According to an embodiment of any paragraph(s) of this summary, the motor and the gearing are parts of an actuator.

According to an embodiment of any paragraph(s) of this summary, the motor and the gearing are parts of an actuator for a flight vehicle.

According to an embodiment of any paragraph(s) of this summary, the motor and the gearing are parts of an actuator for a hypersonic flight vehicle.

According to an embodiment of any paragraph(s) of this summary, the gear drive is a right-angle gear drive wherein an output rotation is perpendicular to an input rotation.

According to yet another aspect of the invention, a gear drive includes: a motor having a motor output shaft; and gearing operatively coupled to the motor; wherein the gearing includes: a face gear having a toothed ridge engaging the motor output shaft, and a central sun gear; and planetary gears engaging the sun gear; and wherein the planetary gears are nested in the face gear, between the central sun gear and the toothed ridge.

According to still another aspect of the invention, a method rotating a carrier includes: turning a motor output shaft of a motor; rotating a face gear via toothed engagement of the output shaft and a toothed ridge of the face gear; rotating a set of planetary gears using the rotation of the face gear, with the planetary gears engaged with a central sun gear of the face gear; and rotating the carrier, which is coupled to the planetary gears to rotate about an axis of the central sun gear as the planetary gears rotate about the central sun gear.

According to an embodiment of any paragraph(s) of this summary, the rotating the carrier includes rotating the carrier in a direction perpendicular to a direction of rotation of the motor output shaft.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

Figure 1:
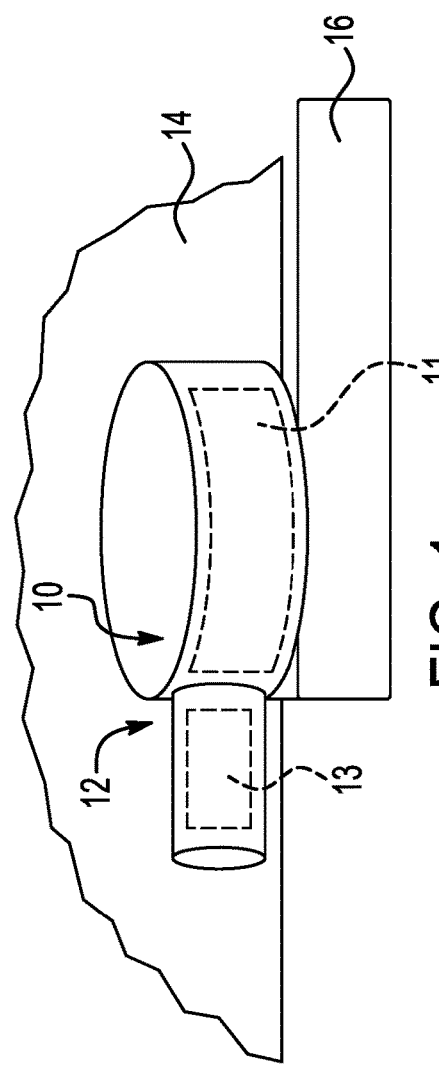
FIG. 1 is an oblique view of a gear drive as part of an actuator, in accordance with an embodiment of the invention.

A gear drive, such as for an actuator, is a right-angle drive where toothed outer ridge of a face gear is coupled to teeth of a motor output shaft, and a set of planetary gears are engaged with a central sun gear of the face gear. The sun gear and planetary gears are aligned with the motor output shaft. For instance the motor output shaft may be substantially in the same plane (substantially co-planar) with the sun gear and the planetary gears. From another standpoint the axis of the motor output shaft may intersect the sun gear, as well as intersecting a volume that the planetary gears sweep through as the planetary gears engage the sun gear.

The arrangement of the gear drive, and in particular the co-planar (or substantially co-planar) arrangement of the motor output shaft and the sun and planetary gears, offers many advantages over other prior configurations. The gear drive is far more compact than other previous arrangements, offering the potential for a substantial reduction in volume that may allow the use of the gear drive in situations where volume is at a premium, for instance as a part of an aerospace actuator, such as an actuator for moving a control surface of a hypersonic flight vehicle.

A control actuator, such as for hypersonic flight vehicles (or many other potential uses), includes a simple low-part compact two-stage drivetrain that restricts the thermal path of incoming heat and migration of heat through an integrated control shaft planetary gear set to a stiff drive gear off of the motor, through the implementation of a face gear. The layout is extremely compact and very efficient. The operation of the actuator is maintained by locating thermally-sensitive electronics for position sensing in such a way as to avoid the high temperatures being input at the control shaft.

The arrangement of the gear drive provides for good performance in terms of high torque and high stiffness. More broadly, the configuration enhances balance, power, and stiffness. For example, the stiffness may be about seven times the frequency response of the gear drive. In addition, the small rotation inertia of the right-angle motor arrangement allows higher bandwidth for the gear drive.

A position sensor may be located at a far end of the gear drive, on an opposite side of the motor from where the motor output shaft engages the face gear. This configuration may aid in isolating the position sensor from heat in the environment where the gear drive output acts, for example at a control surface of a hypersonic or other high-speed flight vehicle that is actuated using the gear drive. The gear drive or actuator may have other features that act as a barrier or otherwise reduce heat transfer through the device. For example there may be air gaps at locations withing the gear drive or associated parts, for example an air gap in a control or output shaft of the device where a part to be moved (such as a fin) is connected, and/or around a central location in the gear drive, such as where the sun gear engages the planetary gears. The relative thermal isolation of the position sensor may facilitate use of the gear train in high-heat environments, such as an actuator for use in a hypersonic or other high-speed flight vehicle.

FIG. 1 shows a general view of a gear drive 10 as a part of a rotational actuator 12. The gear drive 10 may include a gear set 11, and a motor 13 for driving the gear set. The actuator 12 is mounted in a mount object 14, and is used to rotate an output object 16. The objects 14 and 16 may be any of a variety of pairs of objects in which one is to be selectively rotated relative to another. For example the mount object 14 may be a fuselage or other part of an aircraft or flight vehicle, such as a hypersonic or other high speed aircraft or spacecraft, and the output object 16 may be a rotatable part of the flight vehicle, such as a control surface such as a fin, or a thrust reverser or other movable part associated with a jet engine or rocket motor. As another example the output object 16 may be a part of a pump, with the part rotating relative to the rest of the pump in a free-spinning motion. Other possible uses of rotary actuators include land and ground vehicles, where it may be desirable to rotate one part relative to another, for example controlling the fins of a submarine or the rudder of a ship.

Gear drives described herein, which may be parts of actuators, may be used for a variety of different applications, and a wide range of control system products. They may be suitable for use in high-temperature environments, such as in hypersonic flight vehicles, although they may be used in other circumstances. They can be employed (or adapted to be employed) in missile control applications which require hard stops (limited angular deflections). Alternatively they can be used in 360-degree free-spinning actuation situations, such as with elevons or flap deployment. Other possible areas of application include jet engine thrust reversal, high-temperature pump systems, and any of a variety of space-limited applications (situations) where thermal environment is a concern. It will be appreciated that this is far from a comprehensive list of possible uses for the actuators and gear drives described herein.

Figure 2:
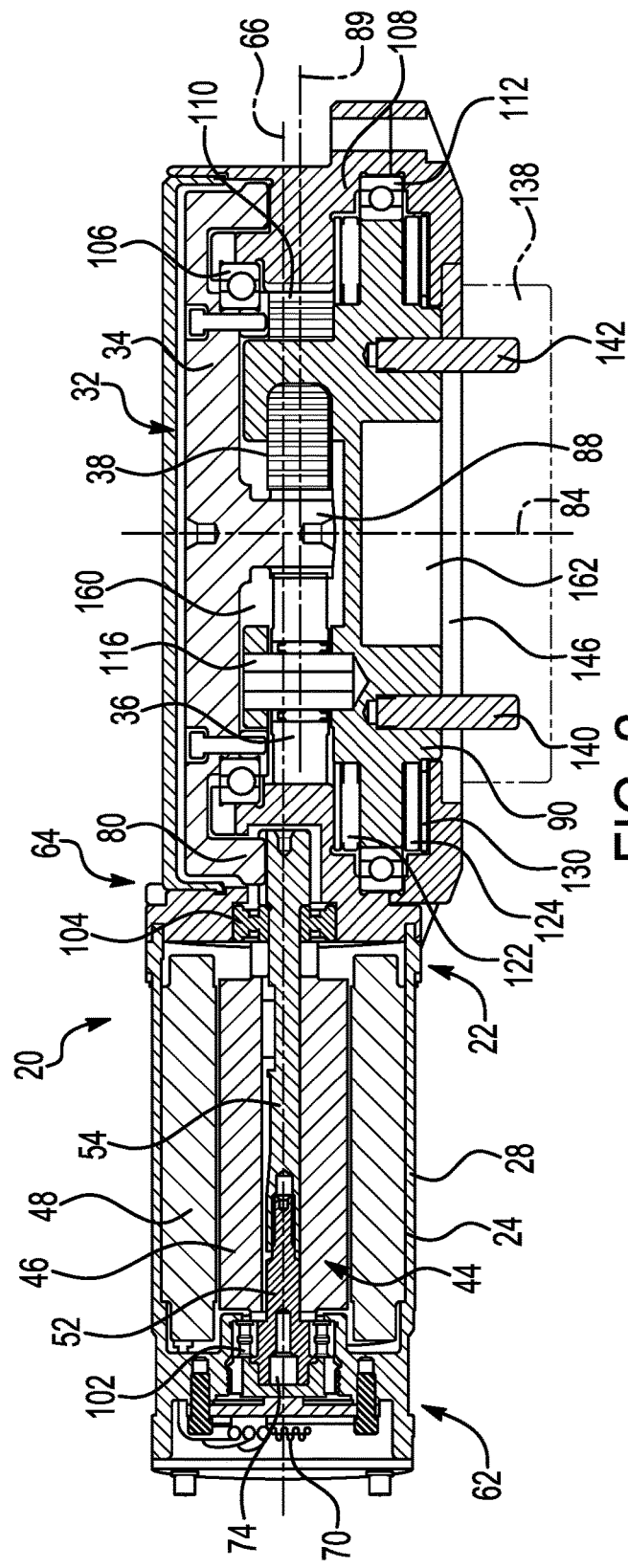
FIG. 2 is side sectional view of an actuator according to an embodiment of the invention.
Figure 3:
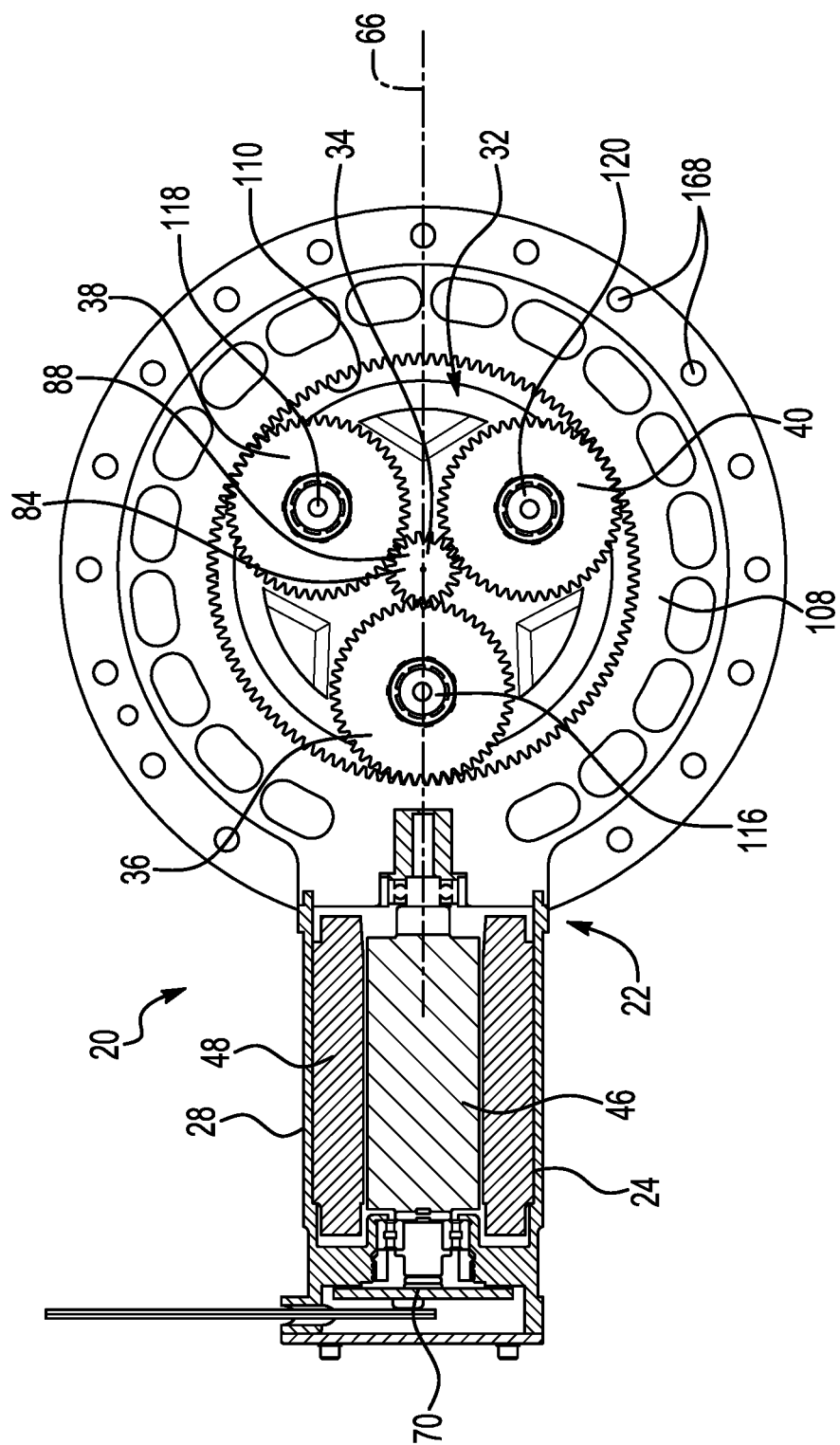
FIG. 3 is a plan view of the actuator of FIG. 2, with portions removed for illustration purposes.

FIGS. 2 and 3 show details of one embodiment, an actuator 20 that includes a gear train or gear drive 22. The actuator includes a motor 24 that is mounted in a motor casing 28, which may be made of a suitable material, such as aluminum, steel, or titanium. The motor 24 is part of a drivetrain 30 that is operatively coupled to a gear set 32. The gear set 32 includes a face gear 34 and a series of planetary gears 36, 38, and 40.

The motor 24 has a two-part or two-piece shaft 44 (also referred to herein as a "motor shaft" or "control shaft") that passes through a rotor 46 of the motor 24, with the rotor 46 surrounded by a stator 48. The shaft 44 is made up of a first shaft part 52 and a second shaft part 54. The first shaft part 52 extends out of a distal end 62 of the motor 24, the side of the motor 24 away from the gear set 32. The second shaft part 54 extends out from the motor 24 at a proximal end 64, toward the gear set 32. The second shaft part 54 acts as a motor output shaft, and the motor output shaft 54 is toothed, to engage the face gear 34. The shaft parts 52 and 54 are mechanically joined together inside the stator 48, and rotate along with the stator 48 about a motor output shaft axis 66.

The motor 24 may be operated as a suitable speed, for example at 8000 rpm, 10,000 rpm, or 12,000 rpm. A suitable controller (not shown) may be used to turn the motor on and off to operate the actuator 20.

A position sensor 70 is located at the distal end 62, away from the gear set 32. This helps thermally isolate or thermally insulate the position sensor 70 from heat generated by and/or transmitted through other parts of the actuator 20. For example a control surface of a hypersonic flight vehicle that is rotated by the gear train 22 may generate heat, which is transmitted back through the gear train 22, the motor 24, and other parts of the actuator 20. Placing the position sensor 70 on the farthest end of the actuator 20 away from the heat source may allow the actuator 20 to be located close to the surface or object it is rotating, as opposed to being located remotely, with additional parts such as a linkage being used to transmit the rotational motion. The motor casing 28 is able to withstand heat, for example being made of titanium. Having the position sensor 70 at the end of the motor casing or housing 28 allows the endurance of the high thermal environment of the hypersonic flight. Such an arrangement may also be advantageous in other high-temperature environments.

The position sensor 70 uses a magnetic sensor 74 to sense rotations of the motor shaft 44, in order to track the movement of components of the rotational actuator 20. The position sensor 70 may use any of a variety of other suitable methods and/or mechanisms to track rotation of the motor shaft 44, in order to track movement of the actuator 20. Higher temperature resolvers, a type of analog position sensor, have been used in place of the magnetic position sensors. Such an alternative may further increase the thermal survivability of the actuator, at the expense of cost.

External connections to the actuator 20 may be made at the distal end 62. Such external connections may include electrical connections for providing power to the motor 24, control signals for controlling actuation of the motor 24, and communication connections for receiving signals from the position sensor 70. The external connections may include wires and/or other connections, such as fiber optic connections.

As noted above, the output motor shaft 54 has teeth, which engage (mesh with) corresponding gear teeth of a toothed outer ridge 80 of the face gear 34. The engagement of teeth may be a spur gear engagement or a helical gear engagement, such that rotation of the motor shaft 44 about the axis 66 causes the face gear 34 to rotate about its face gear axis 84. The motor shaft axis 66 and the face gear axis 84 may be perpendicular to each other, or nearly or substantially perpendicular. The toothed outer ridge 80 is at a distance from the face gear axis 84 that is much greater than the diameter of the motor output shaft 54, providing a substantial gear ratio at the toothed connection between the motor output shaft 54 and the face gear outer ridge 80.

The face gear 34 has a central hub gear 88 which acts as a sun gear, engaging the planetary gears 36, 38, and 40. The overall diameter of the face gear 34 is greater than the diameter of the combination of the face gear central hub sun gear 88, and the planetary gears 36, 38, and 40. Thus the face gear 34 may be said to overlap the planetary gears 36, 38, and 40.

From another standpoint, the planetary gears 36-40 may be said to be nested within the face gear 34. This nesting may be the property by which the planetary gears 36-40 are between the sun gear 88, which is radially inward of the planetary gears 36-40, and the face gear toothed outer ridge 80, which is radially outward of the planetary gears 36-40.

The planetary gears 36-40 may be located in a cupped region of the face gear 34 that is defined between the central hub sun gear 88 and the face gear toothed outer ridge 80. The produces a gear configuration that is compact and allows for a coplanar (or substantial coplanar) gear alignment of the gears 34-40 and the shaft axis 66 of the motor shaft 44, as described further below.

The planetary gears 36, 38, and 40 each may have a larger diameter than that of the sun gear 88. Further, the planetary gears 36-40 sweep around the sun gear 88 at a diameter necessarily greater than that of the sun gear 88. Again, as with the engagement between the motor output shaft 54 and the face gear 34, there may be a substantial gear ratio at the engagement of the face gear 34 and the planetary gears 36-40, as well as with a control output shaft or carrier 90 that rotates about the face gear axis 84 as the planetary gears 36-40 rotate about the sun gear 84.

The motor output shaft axis 66 may be substantially perpendicular to a sun gear shaft axis of the sun gear 88. The sun gear shaft axis is aligned with and may be considered represented by the face gear axis 84. The term "substantially perpendicular" may mean perpendicular to within 0.1 degrees, to within 0.2 degrees, to within 0.5 degrees, to within 1 degree, to within 2 degrees, or to within 5 degrees.

The overall gear ratio between the motor output shaft 54 and the control output shaft 90 may be any of a great variety of ratios, for example around 5000:1. The configuration of gear drives described herein may allow a large flexibility in gear ratio selection. The gear drive 22 is a two-stage right-angle gear drive, as opposed to more conventional three-stage gear systems. Achieving the high gear ratio in a two-stage right-angle gear drive is advantageous, and such an arrangement allows the large flexibility in gear ratio selection.

The central hub sun gear 88 may be in line and/or coplanar with the motor shaft 44. For example the shaft axis 66, when extended out from the motor shaft 44, may intersect or pass through the sun gear 88, and/or through a volume swept out as the planetary gears 36-40 orbit the central hub sun gear 88. The motor shaft axis 66 may be substantially co-planar with a plane 89 of the sun gear 88 and the planetary gears 36, 38, and 40. The plane of the gears 36-40 and 88 may be taken as the plane that contains the center of the connections between teeth of the sun gear 88 and teeth of the various planetary gears 36, 38, and 40. By "substantially co-planar" it is meant that the offset between the motor shaft axis 66 and the plane 90 may be less than a height of the sun gear 88 and/or a height of the planetary gears 36-40. The offset between the motor shaft axis 66 and the plane 89 may be 12.7 mm (0.5 inches) or less, may be 6.35 mm (0.25 inches) or less, may be 2.54 mm (0.1 inches) or less, may be 1.27 mm (0.05 inches) or less, or may be 0.51 mm (0.02 inches) or less.

The actuator 20 has many bearings in place to allow various sorts of relative movement between adjacent parts of the actuator 20. There may be bearings 102 and 104 at ends of the motor shaft 44 to allow rotation of the motor shaft 44. A bearing 106 may allow the face gear 34 to rotate freely relative to a housing 108 of the actuator 20. The housing 108 has a toothed inner surface 110 that engages with (meshes with) the planetary gears 36-40. A bearing 112 may be located between the housing 108 and the control output shaft 90. Roller cage bearings 116, 118, and 120 couple respective of the planetary gears 36, 38, and 40, to the control output shaft 90, to allow the planetary gears 36-40 to rotate about their respective axes as they orbit around the sun gear 88, with the control shaft 90 thereby also rotating at the same rate about the sun gear 88. That is, the control output shaft 90 rotates about the face gear axis 84.

The control output shaft 90 also has an upper flat thrust washer bearing 122 and a lower flat thrust washer bearing 124 to maintain the output shaft 90 in place. A suitable spacer 130 may be located between the lower washer bearing 124 and a cover 134 through which the control output shaft 90 is connected to a part 138 to be rotated by the actuator 20, for example a fin or other control surface (or other possibilities described elsewhere herein). Fasteners 140 and 142, for example threaded fasteners, may pass through an opening 146 in the cover 134, and may be used to connect the part 138 to the control output shaft 90.

The gear drive 22 also includes air gaps that provide a degree of thermal insulation, reducing the amount of thermal energy transmitted through the gear drive 22. There is a central air gap 160 defined around where the sun gear 88 meshes with the planetary gears 36, 38, and 40. In addition there may be an air gap 162, a recess in the control output shaft 90, between the fasteners 140 and 142, where the control output shaft 90 is coupled to the part 138. Actuators such as the actuator 20 may rely on limited contact areas and air gaps, such as the air gaps 160 and 162, to mitigate the migration of heat through the actuator, during a flight vehicle mission (or other use of such actuators where heat migration is a factor). The air gaps 160 and 162 may be omitted where heat transmission is not an issue (or for other reasons). Conversely the air gaps may be larger, and other intersection materials could be added to increase or otherwise affect heat migration. As a further alternative addition thermal isolation (thermally insulating) material may be placed at various locations, such as between the mounting face on the front side, the mounting face on the motor to gear stack interface, and the mounting of the position sensor itself. This may further decrease the heat transfer.

The actuator housing 108 may have mounting holes 168, used for mounting the actuator 20 to surrounding structure, such as the structure of an aircraft, spacecraft, watercraft, submarine, land vehicle, or stationary installation. In one embodiment the actuator 20 is an actuator for an aircraft, such as a hypersonic aircraft, but many other uses are possible for actuators such as that shown, essentially for rotating a part under load in any of a variety of situations.

As noted above, the actuator 20 may include stops (not shown) that limit the rotational travel of the control output shaft 90 and the part 138. Alternatively the actuator 20 may be capable of a full 360-degree rotation of the control output shaft 90 and the part 138.

The various parts of the actuator 20 may be made of suitable materials. For example the actuator 20 may use mostly standard stainless steel materials. or may be made of suitable alloys, for example high-temperature nickel-chromium alloys sold under the trademark Inconel.

Control actuators described herein, the actuator 20 being one example, may have many advantages, including one or more of (in any combination): very compact configuration; modular configuration; no (or mitigated) degradation of performance due to exposure of high temperatures to the control shaft and control fin support bearings; no (or mitigated) degradation of performance due to high temperature intrusion to the position sensing device that is the primary control loop mechanism for the actuator. Use of resolvers may also make the system better able to withstand elevated temperatures.

In one possible application the actuator 20 may be a high-performance compact modular actuator (CMA). The CMA shown in FIGS. 2 and 3 is greatly reduced in volume relative to prior actuator configurations. Such a reduction in volume may facilitate inclusion of such a CMA in small flight vehicles, for example in Raytheon's Hypersonic Air-breathing Weapon Concept (HAWC).

Advantageously, gear interfaces of the gear drive 22 all fall roughly in the same plane. While providing almost just half of the original stack height, this co-planer configuration maximizes balance, power, and stiffness. In a specific embodiment, the stiffness value of the actuator 20 is roughly seven times the frequency response, following good actuator design rules.

Another advantage of actuators such as the actuator 20 is that the small rotational inertia of the right-angle motor allows higher bandwidth. The right-angle configuration of the gear drive 22 provides a good combination of stiffness and compactness in configuration. Also advantageously, part selection and low part count make the actuator an affordable solution for precision motion control.

The modularity and/or composability of the actuators described herein, such as the actuator 20, allows them to be adapted for other uses, such as different types of vehicles, different types or loads, different speeds (of control movement as well as vehicle speed), and/or different temperatures.

Figure 4:
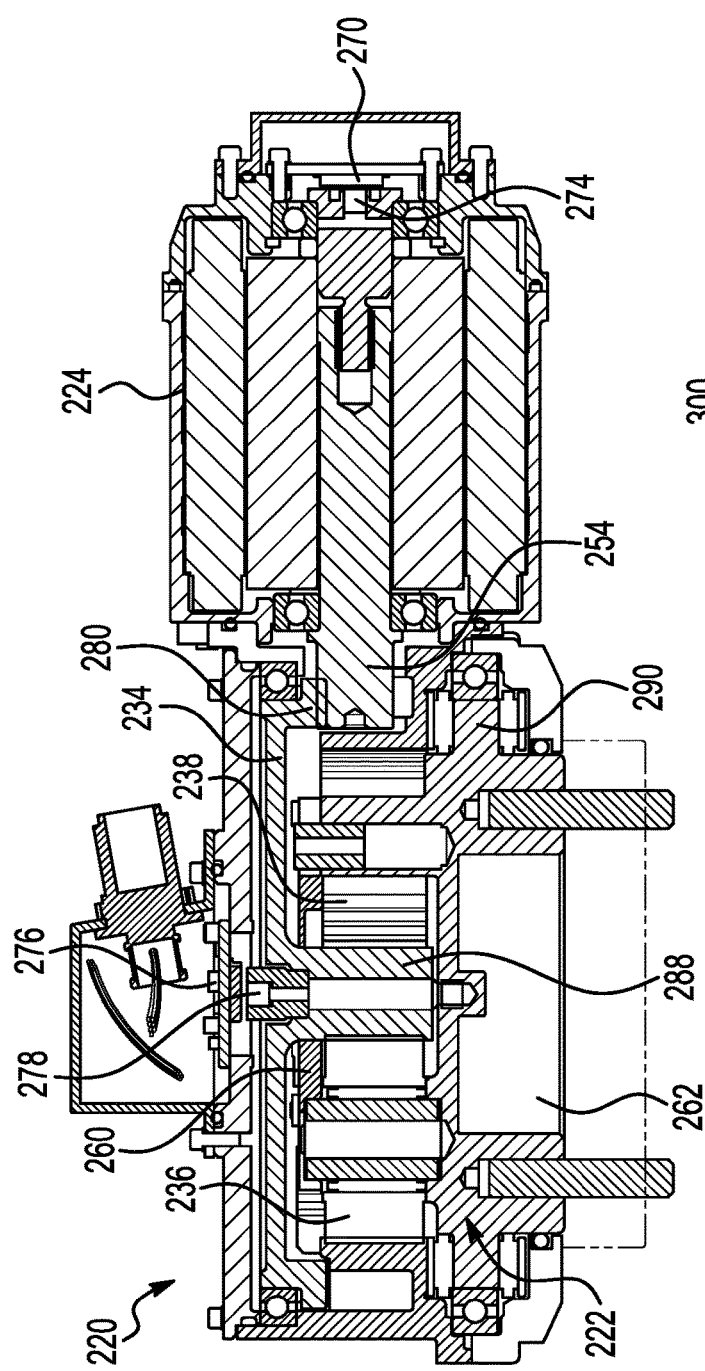
FIG. 4 is a side sectional view of an actuator according to another embodiment of the invention.

Other actuators are possible using a similar configuration, such as a CMA or actuator 220 shown in FIG. 4. Such actuators may have a different size, and/or other different characteristics, from the actuator 20 shown in FIGS. 2 and 3. For instance (to give non-limiting example numbers), the actuator 20 of FIGS. 2 and 3 may have a height of about 5 cm (about 2 inches) or less, and a length of less than 20 cm (8 inches). The actuator 220 of FIG. 4 may be higher and longer, for example having a height of less than 7.6 cm (3 inches) and a length of less than 23 cm (9 inches). Actuators may be resized to fit any of wide variety of requirements, including space requirements and performance requirements.

The actuator 220 has many of the features of the actuator 20 (FIG. 2). For example the actuator 220 has a gear train 222 that includes a face gear 234 and planetary gears 236 and 238. A third planetary gear is not visible in the figure. The face gear 234 has a toothed outer ridge 280 that meshes with a motor output shaft 254 of a motor 224. A central hub 288 of the face gear 234 acts as a sun gear, meshing with the planetary gears 236-238, which orbit around the sun gear hub 288. This rotates an output control shaft 290, which is coupled to an actuated part to be rotated. The output control shaft 290 helps define a pair of air spaces or gaps 260 and 262, which may provide a thermal barrier. The actuator 220 includes a position sensor 270 at a distal end of the motor 224, with a magnetic sensor 274 for detecting rotation of the motor output shaft 254. The actuator 220 also advantageously includes a second position sensor 276 that has a magnetic sensor 278 for detecting rotation of the face gear 234. The second position sensor 276 may allow increased functionality, with the addition of other control circuitry. Resolvers may be used in place of one or both of the magnetic sensors 274 and 278.

Figure 5:
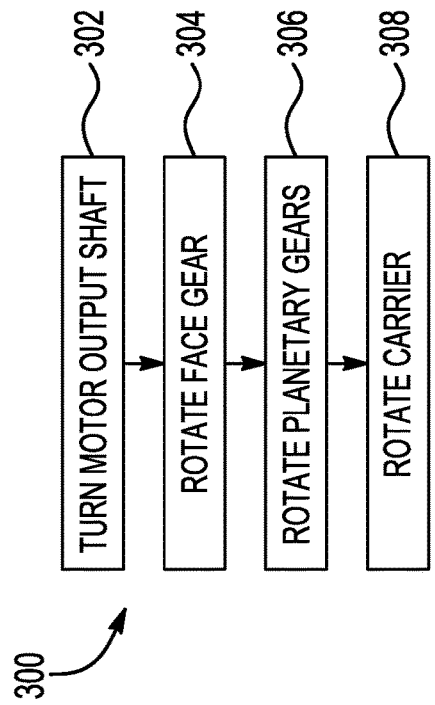
FIG. 5 is a high-level flow chart of a method according to an embodiment of the invention.

FIG. 5 shows a high-level flowchart of a method 300 of rotating a carrier of an object to be rotated, such as by use of the actuator 20 (FIG. 2) or the actuator 220 (FIG. 4). In step 302 a motor output shaft of a motor is turned. In step 304 a face gear is rotated, through a meshing engagement of the motor output shaft and a toothed ridge of the face gear. In step 306 the face gear is used to rotate a set of planetary gears that are engaged with (mesh with) a central sun gear of the face gear. In step 308 a carrier is rotated, with the carrier coupled to the planetary gears to rotate the carrier about an axis of the central sun gear as the planetary gears rotate about the central sun gear.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A gear drive comprising:
a motor having a motor output shaft; and
gearing operatively coupled to the motor;
wherein the gearing includes:
a face gear having a toothed ridge engaging the motor output shaft, and a central sun gear; and
planetary gears engaging the sun gear; and
wherein the motor output shaft defines a motor output shaft axis about which the motor output shaft rotates;
wherein the axis intersects the sun gear, with the motor output shaft axis substantially perpendicular to a sun gear shaft axis of the sun gear; and
wherein the motor output shaft axis also intersects a volume swept out by the planetary gears as the planetary gears rotate about the sun gear.

2. The gear drive of claim 1, wherein the motor output shaft, the sun gear, and the planetary gears are substantially co-planar.

3. The gear drive of claim 1, wherein the face gear overlaps the planetary gears.

4. The gear drive of claim 1, wherein the face gear has a diameter larger than an overall diameter of a combination of the sun gear, and the planetary gears engaged with the sun gear.

5. The gear drive of claim 1, wherein the motor output shaft is a part of a two-piece motor shaft.

6. The gear drive of claim 1, wherein a position sensor is operatively coupled to a motor shaft of which the motor output shaft is at least a part.

7. The gear drive of claim 6, wherein the position sensor is at an opposite end of the motor from the motor output shaft and the toothed ridge of the face gear.

8. The gear drive of claim 1, wherein the motor and the gearing are parts of an actuator.

9. The gear drive of claim 1, wherein the gear drive is a right-angle gear drive wherein an output rotation is perpendicular to an input rotation.

10. A gear drive comprising:
a motor having a motor output shaft; and
gearing operatively coupled to the motor;
wherein the gearing includes:
a face gear having a toothed ridge engaging the motor output shaft, and a central sun gear; and
planetary gears engaging the sun gear; and
wherein the motor output shaft defines a motor output shaft axis about which the motor output shaft rotates;
wherein the axis intersects the sun gear, with the motor output shaft axis substantially perpendicular to a sun gear shaft axis of the sun gear; and
wherein the planetary gears are connected to a control output shaft that acts as a carrier for the planetary gears, and that rotates as the planetary gears orbit around the sun gear.

11. The gear drive of claim 10, where the control output shaft in part defines an outer air gap between the control output shaft and a part to be rotated by the gear drive, with the first air gap including a recess in the control output shaft.

12. The gear drive of claim 10, where the control output shaft in part defines a central air gap where the sun gear meshes with the planetary gears.

13. The gear drive of claim 10, further comprising a part to be rotated, attached to the control output shaft.

14. The gear drive of claim 13, where the part to be rotated is a fin, a control surface, a flap, an elevon, a rudder, an elevator, an aileron, or a canard.

15. The gear drive of claim 10, wherein the motor and the gearing are parts of an actuator for a flight vehicle.

16. The gear drive of claim 10, wherein the motor output shaft, the sun gear, and the planetary gears are substantially co-planar.

17. The gear drive of claim 10, wherein the motor output shaft axis also intersects a volume swept out by the planetary gears as the planetary gears rotate about the sun gear.

18. The gear drive of claim 10, wherein the motor output shaft is a part of a two-piece motor shaft.

19. The gear drive of claim 10, wherein the gear drive is a right-angle gear drive wherein an output rotation is perpendicular to an input rotation.

20. A method rotating a carrier, the method comprising:
turning a motor output shaft of a motor;
rotating a face gear via toothed engagement of the output shaft and a toothed ridge of the face gear;
rotating a set of planetary gears using the rotation of the face gear, with the planetary gears engaged with a central sun gear of the face gear; and
rotating the carrier, which is coupled to the planetary gears to rotate about an axis of the central sun gear as the planetary gears rotate about the central sun gear;
wherein the rotating the carrier includes rotating the carrier in a direction perpendicular to a direction of rotation of the motor output shaft;
wherein the motor output shaft, the sun gear, and the planetary gears are all substantially co-planar.

* * * * *